United States Patent [19]

Jenkins

[11] 4,383,933
[45] May 17, 1983

[54] ORGANO TITANIUM COMPLEXES

[75] Inventor: Fred W. Jenkins, St. Louis, Mo.

[73] Assignee: Petrolite Corporation, St. Louis, Mo.

[21] Appl. No.: 229,901

[22] Filed: Jan. 30, 1981

[51] Int. Cl.$^3$ ............................................. B01D 17/04
[52] U.S. Cl. ...................................... 252/329; 252/344
[58] Field of Search ............................... 252/329, 344; 260/429.5, 429 R

[56] References Cited

U.S. PATENT DOCUMENTS

| | | | |
|---|---|---|---|
| 3,272,757 | 9/1966 | Kelpatrick | 252/344 |
| 3,344,083 | 9/1967 | Dickson | 252/355 |
| 4,088,600 | 5/1978 | Tutein et al. | 252/344 |
| 4,115,423 | 9/1978 | Bulson et al. | 260/429.5 |
| 4,120,815 | 10/1978 | Raman | 252/344 |
| 4,160,742 | 7/1979 | Raman | 252/344 |
| 4,179,396 | 12/1979 | Gabel et al. | 252/344 |
| 4,339,347 | 7/1982 | Quinlan | 252/344 |

*Primary Examiner*—J. L. Barr
*Attorney, Agent, or Firm*—Sidney B. Ring; Leon J. Bercovitz

[57] ABSTRACT

This invention relates to a composition comprising an O/W demulsifier and a titanium compound, and to the use thereof as an O/W demulsifier. The O/W demulsifier contains amino groups, preferably in quaternary form. The titanium compound is believed to combine with the quaternary amino group to form a quaternary amino-titanium complex.

16 Claims, No Drawings

ORGANO TITANIUM COMPLEXES

This invention relates to organo-titanium complexes and to the use thereof in resolving O/W emulsions.

Heretofore, a wide variety of materials have been employed to resolve O/W emulsions. These include a wide variety of organic compounds alone or in combination with metals such as zinc, aluminum, iron or calcium. Typical examples of organic compounds employed as demulsifiers are found in the following:

U.S. Pat. No. 2,407,895 Polymerized Alkanolamines & Derivatives
U.S. Pat. No. Re. 22,963 (Reissue of 2,407,895)
U.S. Pat. No. 3,009,884 Acylated Oxyalkylated Polyamines
U.S. Pat. No. 3,090,759 Polyacrylamides
U.S. Pat. No. 3,200,106 Derivatives of Branched Polyamines
U.S. Pat. No. 3,344,083 Derivatives of Polyethylenimines I have now discovered certain organo-titanium complexes are useful in demulsifying O/W emulsions. These compositions include organic demulsifiers containing amino groups which are employed in demulsification, such as those disclosed in the above demulsification patents, in combination with titanium compounds. The organic demulsifier-titanium combination is superior as a demulsifier to the organic demulsifier itself, the titanium compound itself, or the organic demulsifier in combination with other metals commonly employed such as zinc, aluminum, iron or calcium.

The ratio of organic demulsifier to titanium compound calculated as 100% non-hydrated $TiCl_4$ can vary widely depending on the particular demulsifier, the particular system, etc. In general, the weight ratio of organic demulsifier to titanium compound may vary from about 0.5 to 8, such as from about 0.75 to 5, for example from about $1 \pm 0.2$, but preferably about 1 to 1.

Although I do not wish to be bound by theoretical consideration, the compositions of this invention are believed to be amino-titanium complexes, possibly in the form of quaternary amino-titanium complexes ideally expressed as $\text{N} \cdot \text{Ti}$ or as the quaternary $\text{N}^+ \cdot \text{Ti}\ X^\ominus$ where $\text{N}$ is the amine moiety, $\text{Ti}$ is the titanium-containing moiety and X is an anion. Therefore, the compositions of this invention may be chemically combined entities as well as chemical mixtures. Acid often facilitates the formation of the complex.

Although the demulsifier and titanium compound can be added separately to the emulsion, best results are usually achieved by premixing the demulsifier and titanium compound.

This phase of the invention relates to a process for resolving or separating emulsions of the oil-in-water class, by subjecting the emulsion to the action of the demulsifiers of this invention.

Emulsions of the oil-in-water class comprise organic oily materials, which, although immiscible with water or aqueous or non-oily media, are distributed or dispersed as small drops throughout a continuous body of non-oily medium. The proportion of dispersed oily material is in many and possibly most cases a minor one.

Oil-field emulsions containing small proportions of crude petroleum oil relatively stably dispersed in water or brine are representative oil-in-water emulsions. Other oil-in-water emulsions include: steam cylinder emulsions, in which traces of lubricating oil are found dispersed in condensed steam from steam engines and steam pumps; oil-in-water emulsions occurring in the cooling water systems of gasoline absorption plants; emulsions of petroleum residues-in-diethylene glycol, in the dehydration of natural gas, etc.

In other industries and arts, emulsions of oily materials in water or other non-oily media are encountered, for example, in sewage disposal operations, milk and mayonnaise processing, marine ballast water disposal. In cleaning the equipment used in processing such products, diluted oil-in-water emulsions are inadvertently, incidentally, or accidentally produced. The disposal of aqueous wastes is, in general, hampered by the presence of oil-in-water emulsions.

Steam distillation and other production procedures sometimes cause oil-in-water emulsions to be produced, from which the valuable oils are difficultly recoverable.

In all such examples, a non-aqueous or oily material is emulsified in an aqueous or non-oily material with which it is naturally immiscible. The term "oil" is used herein to cover broadly the water-immiscible materials present as dispersed particles in such systems. The non-oily phase obviously includes diethylene glycol, aqueous solutions, and other non-oily media in addition to water itself.

Among the most important emulsions of non-saponifiable material in water are petroleum oil-in-water emulsions.

Oil-in-water emulsions contain widely different proportions of dispersed phase. Where the emulsion is a waste product resulting from the flushing with water of manufacturing areas or equipment, the oil content may be only a few parts per million. Naturally-occurring oil-field emulsions of the oil-in-water class carry crude oil in proportions varying from a few parts per million to about 20%, or even higher in rare cases.

The present invention is concerned with the resolution of those emulsions of the oil-in-water class which contain a minor proportion of dispersed phase, ranging from 20% down to a few parts per million.

Although the present invention relates to emulsions containing as much as 20% dispersed oily material, many, if not most of them, contain appreciably less than this proportion of dispersed phase. In fact, most of the emulsions encountered in the development of this invention have contained about 1% or less of dispersed phase. It is to such oil-in-water emulsions having dispersed phase volumes of the order of 1% or less to which the present process is particularly directed.

This does not mean that any sharp line of demarcation exists, and that, for example, an emulsion containing 1.0% of dispersed phase will respond to the process, whereas one containing 1.1% of the same dispersed phase will remain unaffected; but that, in general, dispersed phase proportions of the order of 1% or less appear most favorable for application of the present process.

The present process, as stated above, appears to be effective in resolving emulsions containing up to about 20% of dispersed phase. It is particularly effective on emulsions containing not more than 1% of dispersed phase, which emulsions are the most important, in view of their common occurrences.

Some emulsions are by-products of manufacturing procedures in which the composition of the emulsion and its ingredients is known. In many instances, however, the emulsions to be resolved are either naturally-occurring or are accidentally or unintentionally produced; or in any event they do not result from a deliberate or premeditated emulsification procedure. In numerous instances, the emulsifying agent is unknown; and as a matter of fact an emulsifying agent, in the conventional sense, may be felt to be absent. It is obviously very difficult or even impossible to recommend a resolution procedure for the treatment of such latter emulsions, on the basis of theoretical knowledge. Many of the most important applications of the present process are concerned with the resolution of emulsions which are either naturally-occurring or are accidentally, unintentionally, or unavoidably produced. Such emulsions are commonly of the most dilute type, containing about 1% or less of dispersed phase, although concentrations up to 20% are herein included, as stated above.

The process which constitutes the present invention consists in subjecting an emulsion of the oil-in-water class to the action of a demulsifier of the kind herein described, thereby causing the oil particles in the emulsion to coalesce sufficiently to rise to the surface of the non-oily layer (or settle to the bottom, if the oil density is greater), when the mixture is allowed to stand in the quiescent state after treatment with the reagent or demulsifier.

Applicability of the present process can be readily determined by direct trial on any emulsion, without reference to theoretical considerations. This fact facilitates its application to naturally-occurring emulsions, and to emulsions accidentally, unintentionally, or unavoidably produced; since no laboratory experimentation, to discover the nature of the emulsion components or of the emulsifying agent, is required.

The present reagents are useful, because they are able to recover the oil from oil-in-water class emulsions more advantageously and at lower cost than is possible using other reagents or other processes. In some instances, they have been found to resolve emulsions which were not economically or effectively resolvable by any other known means.

The demulsifier may be employed alone, or they may in some instances be employed to advantage admixed with other and compatible oil-in-water demulsifiers.

The process is commonly practised simply by introducing small proportions of demulsifier into an oil-in-water-class emulsion, agitating to secure distribution of the reagent and incipient coalescence, and letting stand until the oil phase separates. The proportion of demulsifier required will vary with the character of the emulsion to be resolved. Ordinarily, proportions of reagent required are from 1/5,000 to 1/1,000,000 the volume of emulsion treated; but more is sometimes required.

In some instances, importantly improved results are obtained by adjusting the pH of the emulsion to be treated, to an experimentally determined optimum value.

The demulsifier feed rate also has an optimum range, which is sufficiently wide, however, to meet the tolerances required for the variances encountered daily in commercial operations. A large excess of reagent can produce distinctly unfavorable results.

The manner of practising the present invention is clear from the foregoing description.

The demulsifiers of this invention are useful in the clarification of water containing emulsified oil or suspended oily solids. The application is especially effective for the resolution of oil-in-water emulsions as encountered in oil fields, oil-in-water emulsions resulting from refinery processes and emulsions of cutting and rolling oils from metal working industries. The demulsifier may be used in simple settling tanks or basins.

This invention can also be used to flocculate and remove oil coated particulate matter.

Any suitable O/W demulsifier can be employed. The most preferable demulsifiers are cationic demulsifiers. Suitable demulsifiers are derived from compositions containing a plurality of amino groups.

The following are illustrative:

(1) Polyalkanolamines such as polyethanolamines such as illustrated in U.S. Pat. No. 2,407,895 and esters thereof (2) Polyalkylene polyamines (3) Polyethyleneimines (4) Polymerized acrylates containing amino groups, for example, Polymerized dimethylaminoethylmethacrylate (5) Polymerized polyalkyleneamines, such as the reaction product of alkylene dihalides with polyalkylenediamines (6) Polymerized vinyl pyridines and alkyl pyridines.

The above demulsifiers containing a plurality of amino groups are preferably employed as quaternaries. For example any of the above polyamines can be quaternized with any alkyl halide or polyalkyl halide, etc.

Suitable alkyl halides include alkyl groups having from 1 to 18 carbons, but preferably lower alkyl groups, i.e., from 1 to 8 carbons, methyl, ethyl, propyl, etc. chlorides.

Dihalides include alkylene dichlorides, etc., ether-containing dihalides such as $ClCH_2CH_2OCH_2CH_2Cl$, unsaturated dihalides such as $Cl-CH_2-CH=CHCH_2-Cl$, etc.

The process is commonly practised simply by introducing small proportions of our demulsifier into an oil-in-water class emulsion, agitating to secure distribution of the reagent and incipient coalescence, and letting the mixture stand until the oil phase separates. The proportion of demulsifier required will vary with the character of the emulsion to be resolved. Ordinarily, proportions of reagent required are from about 1/10,000 to about 1/1,000,000 the volume of emulsion treated; but more or less may be required.

A preferred method of practising the process to resolve a petroleum oil-in-water emulsion is as follows: Flow the oil well fluids, consisting of free oil, oil-in-water emulsion, and natural gas, through a conventional gas separator, then to a conventional steel oil-field tank, of, for example, 5,000-bbl. capacity. In this tank the oil-in-water emulsion falls to the bottom, is withdrawn, and is so separated from the free oil. The oil-in-water emulsion, so withdrawn, is subjected to the action of our reagent in the desired small proportion, injection of reagent into the stream of oil-in-water emulsion being accomplished by means of a conventional proportioning pump or chemical feeder. The proportion employed in any instance is determined by trial-and-error. The mixture of emulsion and reagent then flows to a pond or sump wherein it remains quiescent and the previously emulsified oil separates, rises to the surface, and is removed. The separated water, containing relatively little to substantially none of the previously emulsified oil, is thereafter discarded.

The following will illustrate the operating steps employed to resolve an emulsion of the oil-in-water class by use of a demulsifier of this invention.

In order to test the demulsifier of this invention a natural crude petroleum oil-in-water emulsion is subjected to the action of the demulsifier of this invention at the concentration (ppm) indicated. Thus, a mixture of emulsion and demulsifier is agitated for the time (in minutes), at the shakes per minute (SPM) stated, and then allowed to stand quiescent and read. A check or control sample of the same emulsion is processed the same way except that no demulsifier is added to it.

Throughout the foregoing description, we have referred to "oil" and to "water." By "oil" we mean an oily, non-aqueous liquid which is not soluble in or miscible with water. By "water" we mean water, aqueous solutions, and any non-oily liquid which is not soluble in or miscible with oils.

The results are presented in the following tables. All tests were carried out at atmospheric temperature. The results of the tests were read and rated as follows:

B = Bad
P = Poor
F = Fair
G = Good

In Table I the total number of shakes is stated rather than the strokes per min. Thus 100 shakes means after 100 shakes (total) the sample was read. 200 shakes means that after the first 100 shakes, the sample was shaken an additional 100 more times (total) and again read.

The compositions designated in the Table I are the following. All percentages are by weight.

Compound

A: 9.5% solution of heat polymerized triethanolamine blended with 38% zinc chloride. A standard O/W demulsifier B: 7.4% solution of heat polymerized partial ester, i.e. the partial acetic ester of triethanolamine exhaustively quaternized with methyl chloride C: 7.4% solution of heat polymerized partial ester (Comp. B above) plus 10% titanium tetrachloride D: 10% solution of titanium tetrachloride.

In the above $TiCl_4$ is calculated as non-hydrated $TiCl_4$. The $TiCl_4$ employed is a 20% weight solution.

The above examples were formed by blending the demulsifier with a commercial 20% weight solution of $TiCl_4$. In most instances a solution of demulsifier and $TiCl_4$ was formed on mixing. If separation occurs, a small amount of acid (HCl) promotes a clear solution.

TABLE I

| Ex. No. | Compound | PPM | Reading Agitation 100 SPM | | Reading Agitation 200 SPM | | Reading Agitation 200 SPM 3 Hours Settling |
|---|---|---|---|---|---|---|---|
| 1 | A | 3 | B | | B | | B |
| 2 | " | 5 | B | | B | | B |
| 3 | " | 10 | B | | B | | B+ |
| 4 | " | 20 | B+ | | P | | P+ |
| 5 | " | 40 | B | | B+ | | P |
| 6 | B | 3 | B | | B | | B |
| 7 | " | 5 | B | | B | | B |
| 8 | " | 10 | B | | B | | B |
| 9 | " | 20 | B+ | | P | | F |
| 10 | " | 40 | B | | B+ | | F− |
| 11 | C | 3 | B | | P | Definitely | P− |
| 12 | " | 5 | B+ | Slightly | F− | Best Set | F |
| 13 | " | 10 | P+ | Best | F | Wide Range | F+ |
| 14 | " | 20 | F− | Set | F+ | Best Bottle | G− |
| 15 | " | 40 | F− | | G− | | G |
| 16 | D | 3 | B | | B | | B |
| 17 | " | 5 | B | | B | | P− |
| 18 | " | 10 | P− | | P+ | | P+ |
| 19 | " | 20 | P | | F− | | F− |
| 20 | " | 40 | B | | B+ | | P− |

I claim:

1. A demulsifier composition of matter useful for demulsifying an oil-in-water emulsion comprising
   (1) an O/W organic demulsifier, and
   (2) titanium tetrachloride
the weight ratio of demulsifier to titanium tetrachloride varying from 0.5 to 8.

2. The composition of claim 1 where the O/W demulsifier contains amino groups.

3. The composition of claim 1 where the O/W demulsifier containing amino groups is a polymerized alkanolamine.

4. The composition of claim 3 where the polymerized alkanol amine is a polymerized triethanolamine.

5. The composition of claim 2 where the amino groups are quaternized.

6. The composition of claim 3 where the amino groups are quaternized.

7. The composition of claim 4 where the amino groups are quaternized.

8. A process of demulsifying an O/W emulsion having up to about 20% oil material in the disperse phase which comprises adding to an oil-in-water emulsion system the composition of claim 1, the proportion demulsifier composition ranging from 1 part demulsifier to 5,000 parts emulsion to 1 part demulsifier to 1,000,000 parts emulsion based on the volume of emulsion.

9. A process of demulsifying an O/W emulsion having up to about 20% oily material in the disperse phase which comprises adding to an oil-in-water emulsion system the composition of claim 2, the proportion of demulsifier composition ranging from 1 part demulsifier to 5,000 parts emulsion to 1 part demulsifier to 1,000,000 parts emulsion based on the volume of emulsion.

10. A process of demulsifying an O/W emulsion characterized by treating a system with the composition of claim 3.

11. A process of demulsifying an O/W emulsion having up to about 20% oily material in the disperse phase which comprises adding to an oil-in-water emulsion system the composition of claim 4, the proportion of demulsifier composition ranging from 1 part demulsifier to 5,000 parts emulsion to 1 part demulsifier to 1,000,000 parts emulsion based on the volume of emulsion.

12. A process of demulsifying an O/W emulsion having up to about 20% oily material in the disperse phase which comprises adding to an oil-in-water emulsion system the composition of claim 5, the proportion of demulsifier composition ranging from 1 part demulsifier to 5,000 parts emulsion to 1 part demulsifier to 1,000,000 parts emulsion based on the volume of emulsion.

13. A process of demulsifying an O/W emulsion having up to about 20% oil material in the disperse phase which comprises adding to an oil-in-water emulsion system the composition of claim 6, the proportion of demulsifier composition ranging from 1 part demulsifier to 5,000 parts emulsion to 1 part demulsifier to 1,000,000 parts emulsion based on the volume of emulsion.

14. A process of demulsifying an O/W emulsion having up to about 20% oily material in the disperse phase which comprises adding to an oil-in-water emulsion system the composition of claim 7, the proportion of demulsifier composition ranging from 1 part demulsifier to 5,000 parts emulsion to 1 part demulsifier to 1,000,000 parts emulsion based on the volume of emulsion.

15. The demulsifier composition of claim 1 where the weight ratio of demulsifier to titanium tetrachloride is 1±0.2.

16. The process of claim 8 where the oily material in the disperse phase of the emulsion is not more than about 1%.

* * * * *

UNITED STATES PATENT AND TRADEMARK OFFICE
CERTIFICATE OF CORRECTION

PATENT NO. : 4,383,933
DATED : May 17, 1983
INVENTOR(S) : Fred W. Jenkins

It is certified that error appears in the above—identified patent and that said Letters Patent is hereby corrected as shown below:

Col. 1, Lines 44-45: "(N) . (Ti) or as the quaternary (N) + . (Ti) $X^{\ominus}$"
should be --- (N) · (Ti) or as the quaternary $\overset{+}{(N)}$ · (Ti) $X^{\ominus}$ ---

Col. 4, Lines 34-35: "$Cl-CH_2-CH = CHCH_2 - Cl$" should read ---
$Cl - CH_2 - CH = CHCH_2 - Cl$ ---

Signed and Sealed this

Twenty-fourth Day of January 1984

[SEAL]

Attest:

GERALD J. MOSSINGHOFF

Attesting Officer     Commissioner of Patents and Trademarks